3,246,054
PRODUCTION OF CURED RESIN BODIES BY RADIATION PRE-GELLING AND HOT CURING
John Richard Guenther, Mequon, Wis., and Robert B. Mesrobian, Hinsdale, Ill., assignors to Continental Can Company, Inc., New York, N.Y., a corporation of New York
No Drawing. Filed Apr. 6, 1962, Ser. No. 185,536
6 Claims. (Cl. 264—22)

This invention relates to the rapid and economical curing of resinous materials by combined radiation and heat treatment.

It is known to impregnate porous materials such as paper, cloth of organic fibers, and glass filament fabrics with unsaturated polyesters; and effect a curing by heating in an oven, or by the employement of gamma or beta radiation from various sources. For example, a paper web, impregnated with an unsaturated polyester mixture containing styrene, can be cured by heating for about ten minutes in passing through a 120-foot oven, representing a production speed of about 12 feet of cured resin per minute. A beta-ray generator of the resonant transformer type, operating at one m.e.v (million electron volts) must deliver a dosage of at least 8 megarads (eight million rads) to effect a like cure; this dosage being so large that commercially available beta-ray generators do not deliver the necessary power (in electrical watts) for curing of commercial widths at a satisfactorily rapid speed.

It has been found that a gelling or partial cure of such laminates can be effected by a radiation dosage of about one megarad; and that the curing can then be effected rapidly in an air oven without the occurrence of undesirable blistering effects such as occur when oven-curing of a wet-laid stock is being conducted at high initial temperataures for greater output.

An object of the invention is the production of a cured resin material having a Barcol hardness value of 40 or over, by subjecting a liquid polyester:styrene resin mixture containing a peroxide curing catalyst, to a low intensity beta-radiation at a temperature not exceeding 130 degrees F. whereby to effect a rapid gelling, without blistering or delamination, and thereafter heating rapidly to and at 250 to 300 degrees F. for curing to a Barcol value of 40 or over.

Another object is the production of a coating or laminate having such a mixture in cured form present therein and thereon, by impregnating a porous substrate with the liquid mixture, subjecting to the low intensity radiation to effect gelling in situ, and thereafter rapidly completing the cure by heating to 250 to 300 degrees F.

A further object is the production of shaped articles by subjecting a porous substrate impregnated with such a liquid mixture to gelling by a low intensity beta-radiation, shaping to the desired form, and then curing to a Barcol value of 40 or over by rapidly heating to and at 250 to 300 degrees F.

EXAMPLE 1

A rigid general purpose polyester resin of intermediate viscosity was mixed in the proportion of 100 parts by weight with 8 parts gy weight of styrene. In this example, the polyester was a maleic anhydride and ethylene glycol condensate (the product available commercially under the trademark Pleogen–1300 being employed), and commercial styrene was used as the solvent-additive. The liquid-resin blend had a sp. gr. of 1.14 with a weight of 9.54 lbs. per gallon; acid number 35; viscosity between 2,000 and 2,500 centiposes or Y–2 on the Gardner-Holt scale; color below one. The permissable storage time was found to be more than 6 months without harmful pre-condensation. The S.P.I gel time was 3 to 4 minutes, the S.P.I cure time 5 to 6 minutes, and the S.P.I peak exotherm 400 to 410 degrees F. Before employment for impregnation, 1.0 percent by weight of tertiary butyl perbenzoate was added as curing agent: the pot life was then found to be about five days at room temperature.

This mixture was employed to impregnate a decorated (so-called turquoise concerto) paper. The saturated material was exposed to one m.e.v. of beta-rays at 1.5 microamperes for a dosage of one megarad, while travelling at a linear speed of 30 feet per minute. The liquid resin mixture readily underwent gelation and formed a good gel. Upon removal from the radiation zone, it was exposed to air at 300 degrees F., and therewith atttained a complete cure to a Barcol hardness of at least 40 in 90 seconds time: that is, the product is comparable to that by the above heat curing under commercial slow heat curing or by extensive radiation curing. Comparably, when the uncured saturated web is brought into an air oven at 300 degrees F., pronounced blistering occurs: and hence, such oven curing is commercially effected by gradually warming to the gel point, without exceeding 200 degrees F., and thereafter completing the cure at higher temperature, e.g., 300 degrees F.

The paper is illustrative of a porous substrate which will withstand heating to a temperature of 350 degrees F. while so impregnated, without degradation by loss of strength or discloration: such substrates including paper, glass cloth, asbestos cloth and felt, cotton and linen cloths, rayon cloths. Such substrates may be decorated with designs and ornamentations before impregnation.

The tertiary butyl perbenzoate is illustrative of a curing agent which decomposes at high temperature, but which does not shorten the pot life of the mixture at room temperature, or even up to 120 degrees F., so greatly that the contents of the impregnating vat must be consumed during a single working shift: and thus permits the employment of the impregnating mixture at a greatly reduced viscosity. During the radiation treatment, the peroxide appears to have no significant effect in the gelling: but it is energized during the later oven heating and produces a hard resin rapidly.

By comparison, the dosages of beta radiation, with gelling being produced at one megarad, were 10 megarads to obtain Barcol hardness readings of 30 to 45; with a reading of at least 40 being that for commercially acceptable complete curing. For these, the desirable cures were at saturated web speeds of 10 feet per minute, and 8 to 10 megarads: comparably, speeds of 20 feet or more per minute required dosages beyond 10 megarads, the limit of the apparatus used. Industrial laminates on 15 mil glass cloth have been produced at 10 feet per minute at one m.e.v. for a total dosage of 9 megarads, to produce a Barcol hardness value of 52, indicating a complete cure. 57 mil glass cloth and 50 mil asbestos cloth, at two m.e.v. and a speed of 2½ to 5 feet per minute, with respective total dosages of 9 and 7 megarads gave respective Barcol values of 52 and 57. A chlorinated polyester mixture (the commercially available Hetron–32A being used) was gelled and fully cured under like dosages of 1 megarad and 9 megarads at like line speeds; but discoloration appeared at dosages over 9 megarads in glass reinforced laminates.

The effects of amount of catalyst and line speed are indicated in:

*Table I*

| Run | Cat. | Line Speed | Gel Point | Oven Cure Temp. | Oven Cure Time | Barcol | Remarks |
|---|---|---|---|---|---|---|---|
| 1 | 0.5% BPO | 10 | 1 | 300 | 1-½ | 46 | Cured. |
| 2 | 1.0% BPO | 10 | 1 | 300 | 1 | 42 | Do. |
| 3 | 0.5% TBP | 10 | 1 | 300 | 3 | 46 | Do. |
| 4 | 1.0% TBP | 10 | 1 | 300 | 1-½ | 48 | Do. |
| 5 | 1.0% TBP | 20 | 1 | 300 | 1-½ | 45 | Do. |
| 6 | 1.0% TBP | 30 | 1 | 300 | 3 | 45 | Do. |
| 7 | 1.0% TBP | 30 | 1 | 300 | 1-½ | 0-15 | Delam. |
| 8 | 1.0% TBP | 30 | 2 | 300 | 1-½ | 20 | Do. |

In Table I, "Cat." indicates the catalyst and percentage by weight; with "BPO" being benzoyl peroxide and "TBP" being tertiary butyl perbenzoate. The line speed is stated in feet per minute. The "Gel Point" is given in megarads: each run being in a single pass. The "Oven Cure" has the temperature ("Temp.") stated in degrees Fahrenheit, and the time in minutes. Under "Remarks," the abbreviation "Delam." indicates that blistering occurred during the oven cure: therewith, Runs 7 and 8 show that the line speed should be reduced, and the oven temperature reduced to 250 degrees F. or below with increased oven time, to prevent blistering or delamination. Run 7 had a very low and incomplete curing.

The reinforcing material and the impregnant exhibit reaction to the radiation, noting that the radiation delivers energy to the impregnant in effecting the gelling. The effects of thickness and penetration can be shown:

*Table II*

| Run | Reinforcement Thickness | Reinforcement Material | Line Speed | Gel Dosage | Barcol |
|---|---|---|---|---|---|
| 9 | 50 | Glass | 10 | 1 | 40-45 |
| 10 | 50 | do | 20 | 1 | 45-50 |
| 11 | 125 | do | 10 | 7 | 45-50 |
| 12 | 80 | do | 10 | 2 | 50-55 |
| 13 | 90 | do | 10 | 4 | 20-30 |

The abbreviations are as in Table I. All runs were with 1% TPB catalyst; with oven temperature of 250 degrees F. and time of 3 minutes. "Gel Dosage" is in megarads: in Run 11 even at 7 megarads, there was no gelation at the side opposite to that exposed to the radiation: in Run 12, two passes at one megarad each were made: in Run 13, two passes formed at two megarads each were made, with no gelation being at the opposite side. In Run 12, two glass cloths of 30 and 50 mils were wet-laid in tandem. The one-sided exposure to a dosage of one megarad was not effective with laminates of 80 mils or greater.

A like Run 14, using chlorinated polyester, styrene and 1 percent TBP, with 125 mil glass reinforcement, at a line speed of 10 feet per minute and eight passes at 1 megarad each, gave a gelation at the exposed side but not at the other. After oven curing at 250 degrees F. for three minutes, the exposed side showed a Barcol value of 40, but the opposite side was essentially uncured.

The impregnation of reinforcement cloths and papers is facilitated by low viscosity. The mixtures of polyester resin and styrene decrease in viscosity with increase of temperature: but conversely the probability of premature curing increases with the temperature. Tests as to "Resin Pot Life," that is, the time during which the mixture may be held at impregnation temperature, were made with a mixture of 100 parts by weight of the above ethylene glycol; maleic anhydride resin, 10 parts by weight of commercial styrene, and 1 part by weight of tertiary butyl perbenzoate, with the results:

*Table III*

| Test. No. | Temp. | Visc. | Penet. Cup Initial | Penet. Cup Complete | Pot Life, Days |
|---|---|---|---|---|---|
| 1 | 77 | 580 | 20 | 95 | Over 5 |
| 2 | 100 | 315 | 15 | 70 | Over 4 |
| 3 | 105 | 240 | 11 | 55 | 3 |
| 4 | 110 | 180 | 8 | 45 | 2 |
| 5 | 115 | 165 | 7 | 40 |  |
| 6 | 120 | 135 | 6 | 30 | (¹) |
| 7 | 130 | 105 | 5 | 20 | (²) |

¹ Less than 24 hours.
² Between 8 and 18 hours.

In Table III, Red Scrim and Pearl Grey Decorative Papers, of commercial type, were used. "Temp." indicates temperature in degrees F. "Visc." indicates viscosity (Brookfield) in centipoises. "Penet. Cup" designates the standard cup test for penetration into the paper.

The procedure comprises the use of a low radiation treatment for effecting a gelling and partial curing to not exceeding a Barcol value of 10 at substantially room temperature and not exceeding 130 degrees F., and thus without the blistering and delamination which occurs during a preliminary hot-gelling at temperatures of 250 degrees F. or over, to produce a gelled coherent and non-wet product; and a brief heat treatment at a temperature of 250 degrees F. or above, to effect a curing to a Barcol hardness of 40 or above.

The gelled material can be formed before the heat treatment: thus, it can be shaped into three-dimensionally curved bodies and as partitioned trays and receptacles, and then such shaped articles given the required hardness by the heat treatment. For example, food trays of the so-called "T.V. dinner" type can be made, which can thereafter be heated to food warming or cooking temperatures without degradation of appearance; and surface textures can be conferred upon laminate sheeting.

It is obvious that the invention is not restricted to the illustrative practice, but may be employed in many ways within the scope of the appended claims.

What is claimed is:

1. A method of preparing a shaped article which comprises impregnating a porous substrate selected from the group consisting of paper, glass, asbestos, felt, cotton, linen, and rayon cloths with a liquid consisting essentially of a mixture of an unsaturated polyester resin, styrene and an effective amount of an organic-peroxide curing catalyst and exposing said impregnated substrate to about 1 megarad of beta-radiation while moving the impregnated substrate past the source of radiation at a rate ranging up to about 30 feet per minute to obtain a partially-cured gelled impregnant having a Barcol hardness of about 10, then mechanically shaping said irradiated substrate and subsequently heating same at a temperature ranging from about 250–300° F. for a period of about 1 to 3 minutes to obtain the shaped article with the impregnant having a Barcol hardness of at least 40.

2. The method of claim 1 further characterized in that the curing catalyst is present in an amount ranging up to about 1% by weight of the polyester and styrene mixture and is selected from the group consisting of benzoyl peroxide and tertiary butyl perbenzoate.

3. The method of claim 1 further characterized in that the polyester resin is obtained from the reaction of ethylene glycol and maleic anhydride.

4. The method of claim 1 further characterized in that the liquid mixture consists essentially of 100 parts by weight of the polyester resin and 8 to 10 parts by weight of styrene.

5. The method of claim 1 further characterized in that the porous substrate is glass cloth.

6. The method of claim 1 further characterized in that the impregnated substrate is exposed to about 1 megarad of beta-radiation while moving the impregnated substrate past the source of radiation at a rate ranging from about 10 to 30 feet per minute.

References Cited by the Examiner
UNITED STATES PATENTS

| | | | |
|---|---|---|---|
| 2,959,531 | 11/1960 | Wheelock | 204—154 |
| 2,978,396 | 4/1961 | Shewmaker et al. | 204—154 |
| 2,997,419 | 8/1961 | Lawton | 204—154 |

SAMUEL H. BLECH, *Primary Examiner.*

MURRAY TILLMAN, *Examiner.*